Dec. 27, 1955  W. P. OEHLER ET AL  2,728,313
TRACTOR-MOUNTED PLANTER
Filed Feb. 19, 1951  3 Sheets-Sheet 1
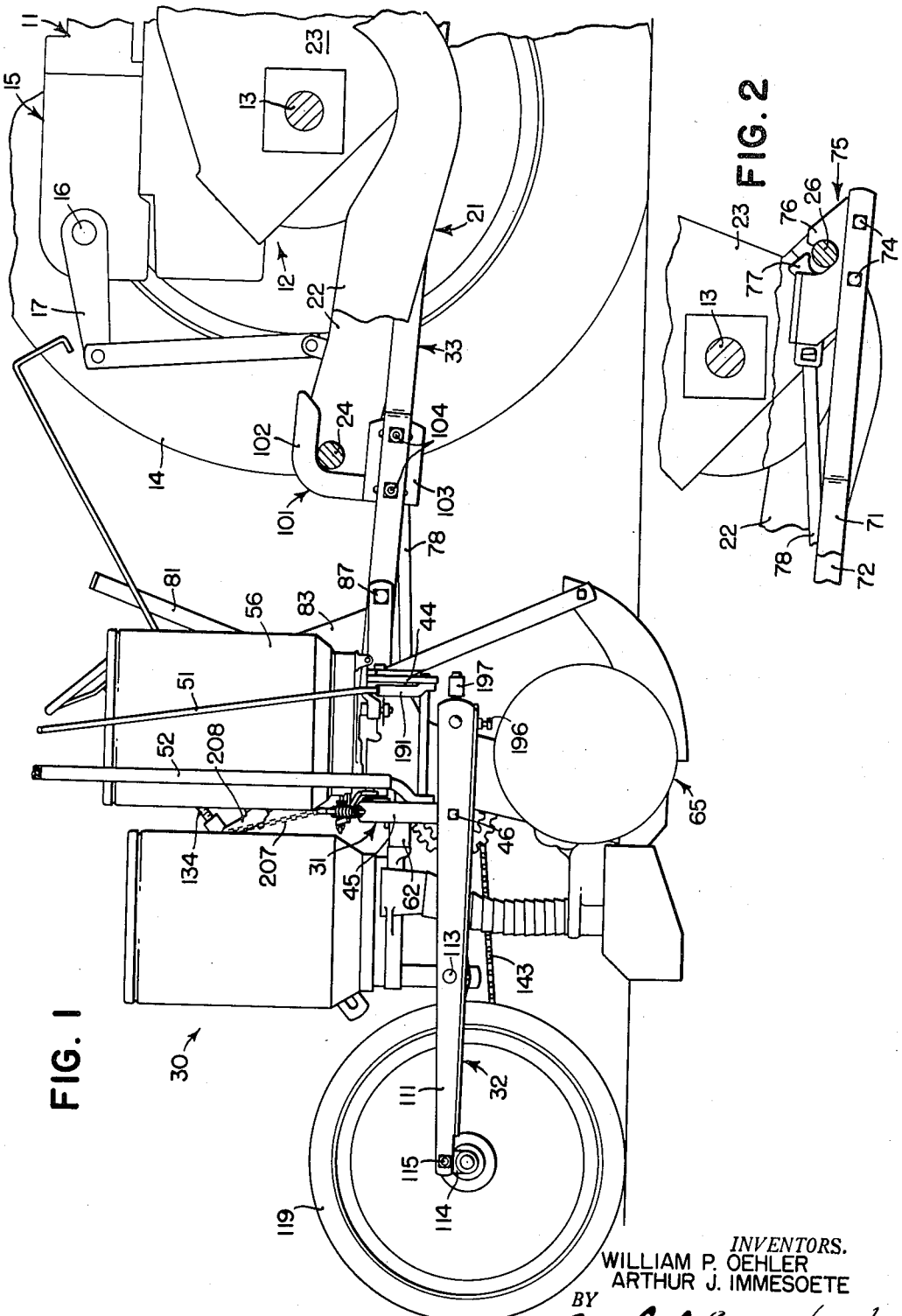
INVENTORS.
WILLIAM P. OEHLER
ARTHUR J. IMMESOETE
BY
R C Johnson and Hillworth
ATTORNEYS Dec. 27, 1955
W. P. OEHLER ET AL
2,728,313
TRACTOR-MOUNTED PLANTER
Filed Feb. 19, 1951
3 Sheets-Sheet 2
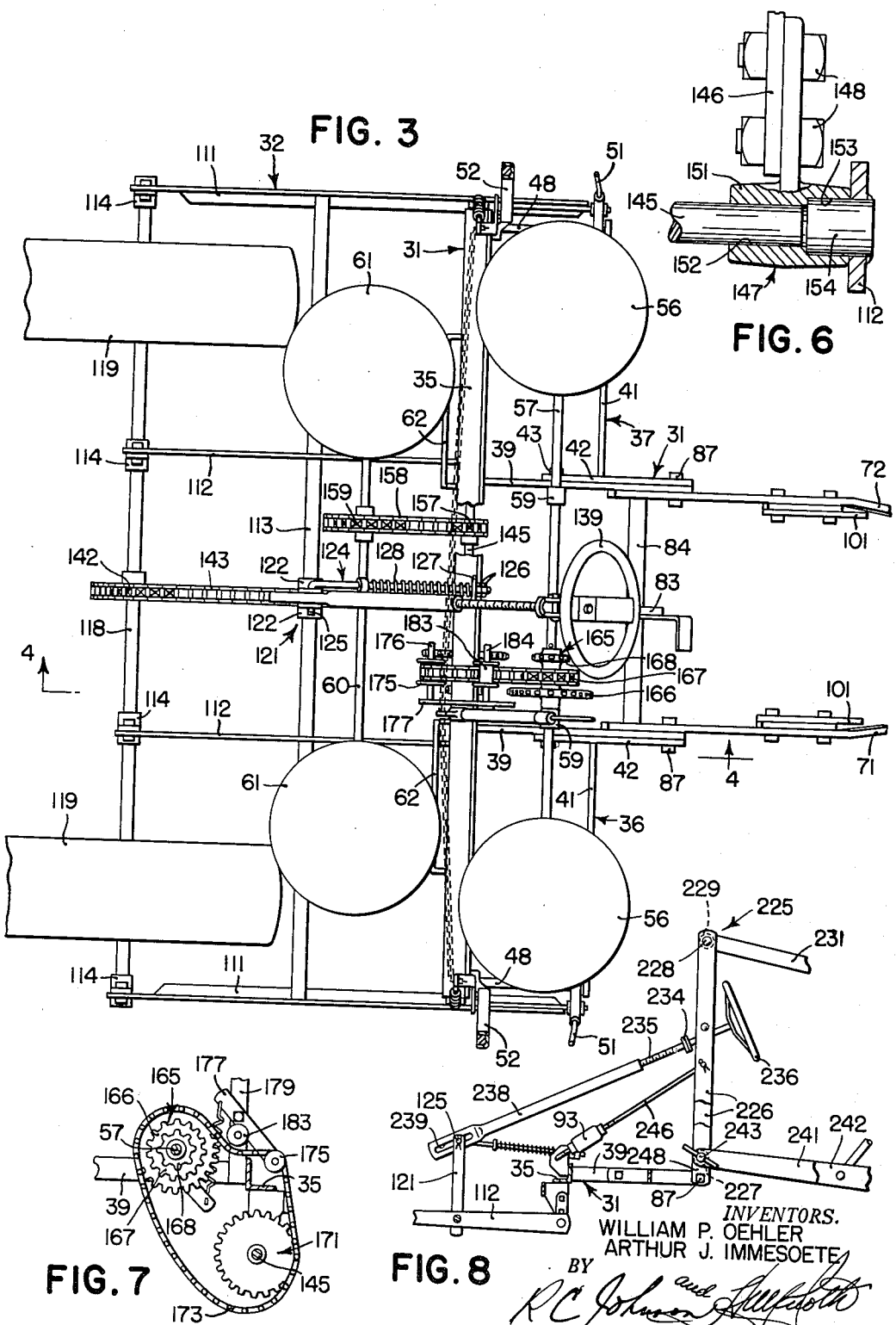
INVENTORS.
WILLIAM P. OEHLER
ARTHUR J. IMMESOETE
BY
R C Johnson and
ATTORNEYS Dec. 27, 1955

W. P. OEHLER ET AL 2,728,313

TRACTOR-MOUNTED PLANTER

Filed Feb. 19, 1951

INVENTORS.
WILLIAM P. OEHLER
ARTHUR J. IMMESOETE
BY

ATTORNEYS

United States Patent Office 2,728,313
Patented Dec. 27, 1955

2,728,313

TRACTOR-MOUNTED PLANTER

William P. Oehler and Arthur J. Immesoete, Moline, Ill., assignors to Deere & Company, Moline, Ill., a corporation of Illinois Application February 19, 1951, Serial No. 211,712

7 Claims. (Cl. 111—59)

The present invention relates generally to agricultural implements and more particularly to planting implements, such as cotton and corn planters.

The object and general nature of the present invention is the provision of a planter of the tractor-mounted type in which provision is made for rapid and convenient attachment of the planting implement to and disconnection from the tractor. Further, it is an important feature of this invention to provide new and improved marker means whereby raising the planter into a transport position automatically effects the raising of the marker arm that immedately previously has been in lowered or operating position. More specifically, it is a feature of this invention to provide a tractor-mounted planter with a pivoted press wheel frame so constructed and arranged that the movement of the press wheel frame relative to the main frame of the planter, when the latter is raised into a transport position, automatically effects the raising of the marker arms. Also, it is a feature of the present invention to provide means for driving the seeding mechanism from the press wheels carried by the pivoted press wheel frame, and new and improved means for transmitting the drive from the press wheel axle to the seeding shaft through a jackshaft that is disposed in axial alignment with the pivot axis about which the press wheel frame moves relative to the main frame. An additional feature of this invention is the provision of a new and improved drive between the jackshaft, driven by the press wheels, and the seeding shaft on the main frame of the planter.

These and other objects and advantages of the present invention will be apparent to those skilled in the art after a consideration of the following detailed description, taken in conjunction with the accompanying drawings in which:

Figure 1 is a side view of a tractor-mounted planter in which the principles of the present invention have been incorporated.

Figure 2 is a fragmentary view shown the connection between the front portion of the hitch frame of the planter and the tractor.

Figure 3 is a plan view of the principal portions of the planter shown in Figure 1.

Figure 6 is a detail view showing the support of the jackshaft and the connection between the press wheel frame and the main frame for movement about an axis coinciding with the axis of the jackshaft.

Figure 7 is a fragmentary detail view showing the mounting by which the drive between the jackshaft and the seeding shaft may be adjusted to secure a different driving ratio.

Figure 8 is a side view of a modified form of the present invention.

Figure 4:
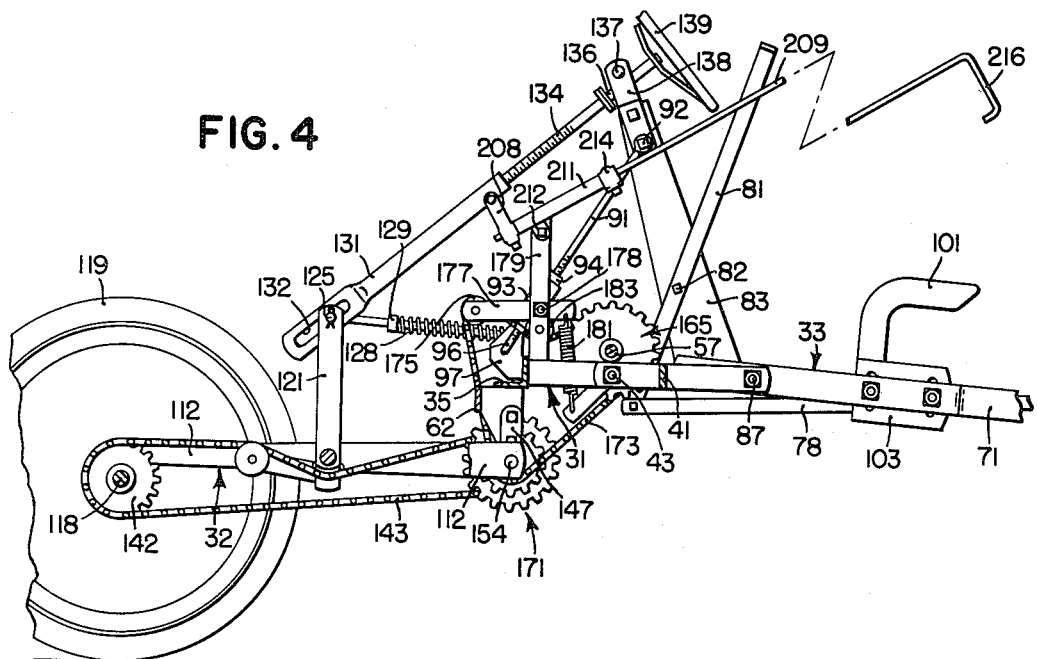
Figure 4 is a sectional view taken generally along the plane of the line 4—4 of Figure 3.

Referring first to Figures 1 and 2, the planter of the present invention is shown as mounted on a tractor 11 which, so far as the present invention is concerned, is largely conventional. The tractor 11 includes a rear axle structure 12 rotatably receiving a pair of axle shafts 13 on the outer ends of which rear traction wheels 14 are fixed. The rear axle structure 12 carries a power lift unit 15 actuated by a hydraulic pump driven by the tractor motor, the power lift unit 15 including a transverse rockshaft 16 on the ends of which power lift arms 17 are mounted. The tractor 11 also includes a vertically swinagble drawbar structure 21 which is pivotally connected at the forward ends of the side arm portions 22 of the drawbar 21 to the drop housings 23 which form a part of the rear axle structure 12. The side portions 22 of the tractor drawbar 21 are interconnected at their rear ends by a rear drawbar member 24. Also carried by the drop housings 23 of the tractor, and preferably coincidental with respect to the transverse axis about which the drawbar 21 is swingable generally vertically, is an implement-receiving member 26 extending generally transversely underneath the rear portion of the tractor.

The planter in which the principles of the present invention have been incorporated is indicated in its entirety by the reference numeral 30 and includes inter alia a main frame 31, a press wheel frame 32, and a hitch frame 33. The main frame 31 comprises a transverse frame member in the form of an angle 35, a pair of right- and left-hand front frame members 36 and 37 and a pair of generally fore-and-aft extending bars 39. The right- and left-hand front frame members 36 and 37 are of similar construction, each including a laterally outwardly extending bar section 41 secured at its laterally inner end, as by welding, to a fore-and-aft extending attaching section 42, the latter section and the adjacent portions of the associated fore-and-aft extending bar 39 being apertured to receive connecting bolts 43. The laterally outer end of each of the front frame bars 41 is provided with a downwardly turned, apertured bracket section 44, and fixed to each of the laterally outer ends of the rear frame angle 35 is a depending bracket section 45. The lower end of each bracket section 45 is apertured to receive a pivot member 46 on which the associated outer frame member of the press wheel frame 32 is pivotally mounted, as will be referred to later in detail. Each bracket 45 includes an auxiliary section 47 which is apertured so as to provide an opening in alinement with the opening in the lower downturned portion 44 of the front frame bar 41. Disposed in each pair of openings is a shaft member 48 to which the inner ends of the front and rear marker arm sections 51 and 52 are fixed. Each pair of marker arm sections 51 and 52 forms a part of a marker arm which per se is of conventional construction except as to the means by which the press wheel frame 32 controls the marker arms, as will be referred to in detail later. The main frame 31 is arranged to carry a pair of seed hoppers 56, each of which includes in the lower portion thereof seed dispensing mechanism which is driven by a transversely disposed seeding shaft 57. The shaft 57 extends across the planter and has its outer ends supported in the bottom portions of the hoppers 56, the generally central portions of the seeding shaft 57 being carried in bearing brackets 59 fixed to the fore-and-aft extending frame bars 39. The main frame 31 is also adapted to support a pair of fertilizer hoppers 61, in the lower portion of which is fertilizer distributing mechanism, conventional so far as the present invention is concerned. Each fertilizer distributing mechanism is driven by a transverse fertilizer drive shaft 60 which at its outer ends is carried in the lower portions of the hoppers 61. Each hopper 61 is bolted to a transversely disposed, hopper-receiving bracket 62, as by bolt means or the like, inserted in selected holes formed in the hopper-supporting brackets 62. The seed hoppers 56 are likewise laterally adjustable along the main frame angle 35, together with their associated furrow openers 65. The latter units also carry fertilizer furrow openers 66 into which fertilizer, distributed by the distributing mechanism in the hoppers 61, is discharged under the control of suitable gate mechanism (not shown).

The main frame 31, together with hte press wheel frame 32, described below in detail, is adapted to be connected with the tractor 11 through the forwardly extending hitch frame 33. The latter includes a pair of generally fore-and-aft extending, forwardly converging frame bars 71 and 72, the forward converged portions of the bars 71 and 72 being disposed generally in parallelism and interconnected together by bolt means 74, which means also secures a latch unit 75 to the front ends of the hitch frame bars 71 and 72. The latch unit 75 includes a forward hook section 76 and a fore-and-aft shiftable detent member 77 which is biased by suitable spring means for forward movement into engaging position with respect to the tractor-carried transverse hitch bar 26. The detent 77 is controlled by a fore-and-aft extending member 78 which at its read end is connected to the lower end of a manually operated lever 81 pivotally mounted, as at 82, on a vertically extending standard 83 which at its lower end is secured, as by welding, to a transverse bar 84 the laterally outer ends of which are fixedly secured, as by welding, to the rear ends of the hitch frame bars 71 and 72, as best shown in Figure 3. The main frame 31 is pivotally connected with the hitch frame 33 for generally vertical movement relative thereto about a transverse axis defined by a pair of pivot bolts 87. The bolts 87 are extended through openings formed in the forward portions of the fore-and-aft extending frame bars 39, the bolts 87 also extending through openings formed in the forward portions of the associated front frame attaching sections 42. The position of the main frame relative to the hitch frame is controlled by means of a generally vertically extending adjusting rod 91 pivotally connected at its upper end, as at 92, to the upper portion of the standard 83. The lower end of the rod 91 is threaded and is extended into a turnbuckle sleeve 93, being fixed with respect to the latter by means of a lock nut 94. The lower end of the turnbuckle sleeve 93 receives the upper threaded end of a lower rod member 96, the lower end of which is pivoted to a bracket 97 that is fixed to the generally central portion of the main frame angle 35, as best shown in Figure 4. A lower lock nut serves to fix the lower rod member 96 relative to the turnbuckle sleeve 93. Turning the latter, after the lock nuts 94 have been loosened, provides for adjusting the position of the main frame of the planter relative to the hitch frame 33, and thus provides means for leveling the furrow openers 65 and 66 in a fore-and-aft direction, thus adjusting the position of the front end of the hitch frame 33 for connection to any one of several different tractors. Adjustment of the front end of the hitch frame 33 when the furrow openers are leveled is desirable so as to provide means whereby the planter may be connected to the draft bars 26 of different tractors in which the draft bars 26 may be disposed at different heights above the ground.

The draft or hitch frame 33 carries a pair of hook members 101 which are adapted to be engaged over the transverse member 24 of the tractor drawbar 21. Each hook member 101 includes a vertically disposed, generally L-shaped member 102 secured at its lower end to an adjustable plate 103 which is provided with a plurality of apertures, receiving a pair of attaching bolts 104 and providing means whereby the vertical position of each attaching member 101 may be varied as desired. Preferably, the parts 101 are so adjusted as to provide some lost motion vertically between the transverse drawbar member 24 and the hitch frame 33, thereby providing for some floating or relatively free vertical movement between the planter unit and the drawbar of the tractor, which normally is fixed against movement, at least downwardly, relative to the tractor by the lift arms 17. This lost motion also provides means whereby the planting unit may tip laterally in one direction or the other and to a limited extent, as determined by the positions of the hook members 101 on the hitch frame 33.

Referring now to the press wheel frame 32, pivotally connected with the main frame 31, the press wheel frame 32 comprises a pair of laterally outer, generally fore-and-aft extending frame angles 111 and a pair of generally fore-and-aft extending laterally inner frame bars 112. The bars 111 and 112 are rigidly secured, as by welding, to a transverse reenforcing shaft section 113 and the forward portions of the laterally outer bars 111 are apertured to receive the pivot members 46 (Figure 5) mentioned above. The rear end of each of the press wheel frame bars 111 and 112 carries a bearing bracket 114, each preferably being secured to the associated frame bar by suitable bolt means 115. The bearing portions of the brackets 114 are disposed in transverse alignment and rotatably receive a press wheel shaft 118 to which the press wheels 119 are securely fixed, as by any suitable means. Preferably, the press wheel 119 at each side of the implement is disposed between the frame bars 111 and 112 at that side of the tractor.

Rigidly secured to the central portion of the reenforcing shaft section 113 is a vertically extending standard 121, preferably comprising a pair of vertically extending strap members 122, the lower ends of which are welded to the cross section 113 and the upper ends of which are apertured to receive the laterally turned end 125 of a control rod 124, the forward end of which is threaded and extended through an aperture in a vertically extending portion 127, which forms a part of the bracket 97 that receives the main frame adjusting rod 91, 96. A spring 128 is disposed about the press wheel control rod 124 and disposed between the rear face of the bracket 127 and the forward face of an adjustable set screw collar 129 carried by the rod 124. Preferably, the parts are arranged so that the spring 128 exerts a continual bias tending to swing the press wheel frame downwardly, or in a counterclockwise direction as viewed in Figures 1 and 4, relative to the main frame of the planter. The downward movement of the press wheel frame in this direction is, however, limited by virtue of the contact between the lock nuts 126 and the forward side of the bracket 127. Disposing the adjustable collar 129 in various positions along the rod 124 serves to control the tension exerted by the spring 128. Movement of the press wheel frame 32 relative to the main frame 31 is limited by means of a strut member 131, the lower portion of which is flattened and slotted, as at 132, the rod end 125 being extended through the slot 132. The upper portion of the member 131 is internally threaded to receive a threaded adjusting rod 134, the upper portion of which is extended through and held against axial displacement relative to a sleeve member 136 swiveled, as by a pair of trunnions 137, in a bracket 138 that is fixed to the upper end of the hitch frame standard 83. The upper or forward end of the adjusting rod 134 carries a hand wheel 139 by which the rod 134 may be rotated to adjust the position of the slotted member relative to the main frame 31 and the hitch frame 33.

A sprocket 142 is fixed to the central portion of the press wheel shaft 118 and receives a driving chain 143 which at its forward portion is trained over a sprocket (not shown) carried by a jackshaft 145. The jackshaft 145 is carried by the main frame in transverse axial alignment with the pivots 46 by which the laterally outer frame members 111 of the press wheel frame are swingably connected for generally vertical movement relative to the main frame 31. To this end, as best shown in Figure 6, the main frame angle 35 is provided with a pair of depending brackets 146 disposed generally centrally of the main frame and arranged in laterally spaced apart relation. The lower end of each bracket 146 receives a bearing member 147 secured to the bracket 146 by any suitable means, such as a pair of connecting bolts 148. Each bearing 147 includes a transversely disposed sleeve section 151 having a socket 152 at its laterally inner end adapted to rotatably receive the associated end of the jackshaft 145. Also, each bearing member 147 is provided with a laterally outwardly extending socket 153 adapted to rockably receive a trunnion 154 fixed, as by welding, in an opening formed in the associated laterally inner press wheel frame member 112. The sockets 152 and 153 are disposed in axial alignment with one another and with the corresponding sockets at the other side of the press wheel frame, the bearing members 147 disposing the jackshaft 145 in axial alignment with the press wheel frame pivot members 46. The jackshaft 145 is freely rotatable within the bearing members 147 but is held against lateral displacement in either direction within the sleeves 151 by the press wheel frame trunnions 154.

The jackshaft is rotated from the press wheel shaft 118 by the driving chain 143, as described above, and the jackshaft 145 carries a sprocket 157 which drives a chain 158 trained over a sprocket 159 fixed to the fertilizer shaft 60, whereby the latter is driven from the press wheel shaft 118. Secured to the seeding shaft 57, as by any suitable means, is a compound sprocket gear member 165 having three sprocket sections 166, 167 and 168 of varying diameter, as best shown in Figure 3. A second compound sprocket gear member 171 is mounted for axial movement along the jackshaft 145 but is connected to rotate with the jackshaft 145 by any suitable means such as a keyway in the jackshaft and a projection on the gear member 171 extending into the keyway. The gear member 171 is shiftable axially along the jackshaft into different positions and is held in any selected position by any suitable means, such as a ball detent or the like. A driving chain 173 is adapted to be trained over selected sprocket sections and is of sufficient length that it may be trained over the largest sprocket section of each of the compound sprocket members. In order, however, to keep the driving chain 173 tight, the chain is trained over an idler roller 175 carried on a shaft 176 fixed to the outer end of a pivoted idler arm 177, the latter being pivotally connected, as by a pivot bolt 178, to a vertically extending arm 179 that is fixed, as by welding, at its lower end to the main frame angle 35, as best shown in Figure 4. A spring 181 is connected between the main frame and the forward end of the idler arm 175, the spring 181 serving to swing the rear end of the idler arm 177 upwardly so as to maintain the upper run of the driving chain 173 tight at all times. However, if it should be desired to change the driving ratio between the jackshaft 145 and the seeding shaft 57, all that it is necessary to do is to manually depress the idler arm 177 a distance sufficient to permit the chain 173 to be disengaged therefrom, and then move the shiftable gear member 171 along the shaft 145 into the selected position. The chain 173 is of sufficient length that it may, without adding or taking out any of the links, be disposed for driving connection about any one of the sprocket sections of each of the sprocket members 165 and 171. Similarly, the arm 177 is of sufficient length that it is enabled to keep the upper run of the driving chain 173 tight even though it be disposed or entrained around the smallest sprocket of each of the sprocket members 165 and 171. In addition to the idler roller 175, the upper run of the chain 173 is trained over an idler roller 183 journaled on a stub shaft 184 carried by the vertical bar 179 just below the pivot member 178 (see Figure 4) on which the idler arm 177 is mounted.

Figure 5:
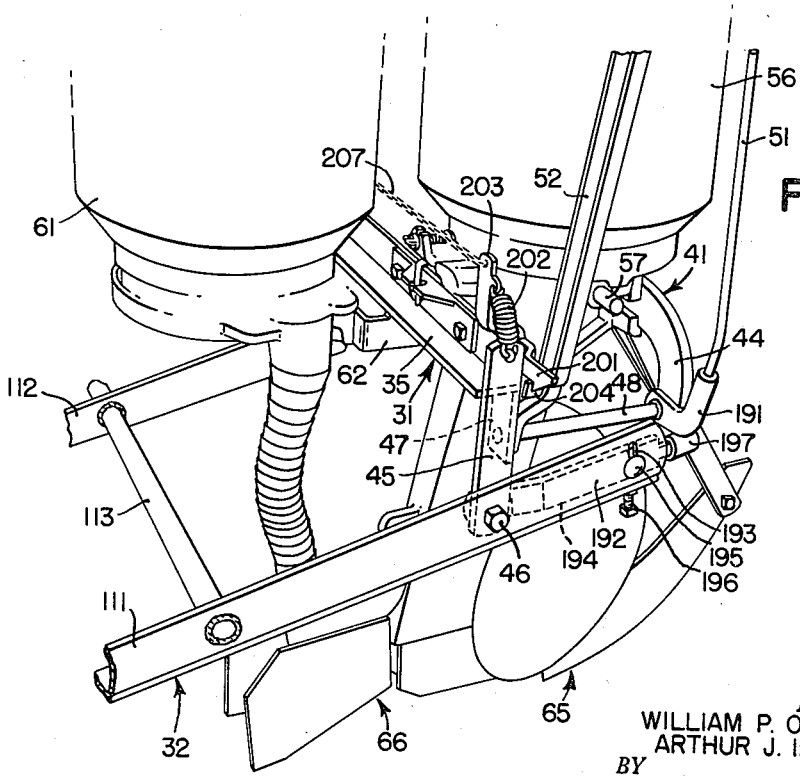
Figure 5 is a fragmentary perspective view showing marker controlling mechanism.

It was mentioned above that vertical swinging of the press wheel frame 32 relative to the main frame 31 is utilized for controlling the marker arms. Referring now to Figure 5, it will be noted that an angled cam member 191 is fixed to each marker arm section 51 adjacent or at its point of connection with the marker arm shaft 48. Each end of the laterally outer press wheel frame angles 111 is extended forwardly, as at 192, and is slotted, as at 193, to receive a marker controlling arm 194 adjustably mounted on each press wheel frame member 111. Preferably, the rear end of the marker control arm 194 is apertured to receive the associated pivot member 46 and carries a clamping bolt 195 that is extended through the slot 193. A set screw abutment member 196 is carried at the forward end of each press wheel frame member 111 and serves as a lower stop for the marker control arm 194. The forward end of the latter is rounded so as to receive a roller 197 which underlies the cam member 191 on the associated marker arm section 51.

The roller 197 and associated parts thus provide a form of connecting means between the press wheel frame and the marker arms. As will be seen from Figure 1, most of the weight of the press wheel frame 32, particularly the press wheels 119, lies rearwardly of the transverse axis defined by the pivot members 46, and therefore, since the center of gravity of the press wheel frame and associated parts lies back of the aforesaid transverse axis, and the press wheel frame and associated parts are heavier than the marker arm that is then in lowered position, when the planter is raised as by operation of the power lift means 15, the rear portion of the press wheel frame 32 swings downwardly, relative to the main frame 31 about the aforesaid axis, and through the aforesaid connection the marker arm that is then in lowered position will be raised, by virtue of the upward movement of the marker control arm 194 acting against the associated cam member 191. When the marker arm reaches its raised position, the nose of a latch 201, biased for downward movement by a spring 202 which acts between the upper end of the associated bracket 45 and an arm section 203 of the latch 201, engages over a lug 204 carried by and fixed to the inner end of the marker arm section 52. Each of the upwardly extending latch arms 203 is apertured to receive the laterally outer end of a controlling chain 207, the central portion of which is anchored to an arm 208 which is fixed to a rockable rod member 209. Preferably, the arm 208 is clamped by any suitable means to the lower or rear end of the rod 209, the lower end being rockably mounted in a sleeve 211 that is adjustably fixed, as at 212, to the upper end of the bracket 179. At its upper end the sleeve 211 is disposed to receive a set screw collar 214 which is fixed to the rod 209 and thus, acting with the clamping arm 208, the collar 214 holds the rod 209 in position. The forward end of the rod is formed as a handle 216. Since the upper end of the arm 208 is connected to the central portion of the chain 207, swinging the handle 216 in one direction or the other, laterally of the planter, will result in disengaging one or the other of the latches 201 from the associated marker arm, which permits the latter to swing downwardly into operating position, providing the planter itself has been lowered into its operating position with the weight of the rear portion of the implement sustained on the press wheel frame 32 and the associated press wheels 119. When the weight of the implement is so imposed, the press wheel frame 32 is, in effect, swung upwardly relative to the main frame of the planter, and this results in a lowering of the marker arm control rollers 197, the latter taking the position shown in Figure 1 spaced from the associated marker arm and its controlling cam 191. It will be understood from Figure 4, that when the planter is lowered into an operating position, with the weight of the planter, at least the rear portion thereof, supported on the press wheels 119, the rear end 125 of the rod 126 moves into a position adjacent the upper or forward end of the slot 132, but not necessarily against the upper end of said slot, since the spring 128 is designed to resiliently support the main frame on the press wheel frame in operation so as to provide for substantially constant pressure of the press wheels 119 against the surface of the ground while permitting a limited amount of up-and-down movement of the furrow openers, whereby the implement is enabled to operate over relatively uneven ground.

In operation, when it is desired to raise the implement for transport, or for turning at the ends of the rows, the tractor power lift 15 is actuated to swing the lift arms 17 upwardly. This raises the tractor drawbar 21 and, acting through the hook members 101, raises the interconnected hitch and main frames of the planter. As the latter is lifted, the weight of the press wheel frame, together with the press wheels themselves and associated parts, and also aided by the force exerted by the spring 128, becomes effective to swing the press wheel frame, relative to the main frame, in a generally counterclockwise direction as viewed in Figures 4 and 5. This causes the forward ends of the press wheel frame members 111 to be elevated, whereupon the rollers 197 are raised. Thus, the marker arm that previously was lowered and in operating position is therefore automatically raised into an inoperative or transport position, and when that arm reaches its transport position, the latch 201 associated therewith will automatically engage the lug 204 and hold the arm in its uppermost position even though the press wheel frame should again be raised, relative to the main frame, as by lowering the planter again into an operating position. However, the operator by swinging the handle 216 in one direction or the other may select whichever one of the marker arms he desires to drop into operating position. By loosening the bolt 195 and turning the abutment bolt 196 in one direction or the other, the marker arm actuating members 194 may be adjusted so as to insure that the downward movement of the press wheel frame relative to the main frame will always lift the associated marker arms into a position to be locked by the latches 201.

When it is desired to disconnect the implement from the tractor, all that it is necessary to do is to swing the hand lever 81 forwardly, which withdraws the hitch detent 77, and then by lowering the tractor drawbar, the front end of the hitch frame drops down a distance sufficient to permit the draft part 26 to pass forwardly over the draft hook 76 (Figure 2), and since the transverse member 24 of the tractor drawbar 21 is free to pass forwardly out of engagement with the lifting hook members 101, the tractor may then be driven forwardly away from the implement. In order to insure that the front end of the hitch member or hitch frame 33 may swing downwardly a distance sufficient to disengage the latch 75 from the draft part 26, the slot 132 is of such length as to accommodate a limited amount of up-and-down movement of the forward end of the draft or hitch frame 33.

In Figure 8, a modified form of the present invention is shown. According to this form of the invention, the planter frame 31 is shown as connected to a hitch structure 225 which includes a pair of vertically disposed members 226 secured, as by welding, at their lower ends to a crossbar 227. At their upper ends, the bars 226 are apertured to receive a pin 228 that is adapted to extend through the ball joint 229 carried at the rear end of an upper compression link 231 which forms the upper part of an implement-connecting linkage known as the Ferguson system and shown in the patent to Ferguson 2,118,181, dated May 24, 1938. In this system, the connection between the implement and the tractor includes the upper link just mentioned and two lower tension links, each link being connected with the tractor through universal or ball joints, and each link including at its rear end a ball and socket device. Intermediate the vertical members 226, the latter are apertured to receive the trunnions of a swivel member 234 in which a screw-threaded shaft 235 is rotated. The forward end of the shaft 235 carries a hand wheel 236 and the rear end of the threaded shaft 235 is received within the screw-threaded nut section of a tubular strut 238, the rear end of which is slotted, as at 239, and is adapted to receive the pivot connector 125 (see Figure 4) on the press wheel frame of the planter. The two lower links of the Ferguson system are indicated by the reference numerals 241 and 242, and the lower hitch bar 227 carries suitable pin means 243 which are adapted to be inserted through the balls at the rear ends of the Ferguson links 241 and 242. A planter frame adjusting rod 246 is connected between the vertical bars 226 and the turnbuckle sleeve 93 of the planter, whereby the angular position of the planter frame relative to the vertical hitch structure 225 may be adjusted as desired. The transverse bar 227 carries depending lugs 248 which are arranged in spaced apart relation and are apertured at their lower ends to receive the pivots 87 by which, in the form of the invention shown in Figures 1–7, the hitch frame 33 is pivotally connected with the forward bars 39 of the planter frame.

The operation of the form of the invention shown in Figure 8 is substantially the same as described above in connection with Figures 1–7. When the links 241 and 242 are raised to raise the implement into a transport position, the downward movement of the press wheel frame relative to the planter frame serves to raise whichever one of the markers that immediately preceding was in its lowered position.

While we have shown and described above the preferred structure in which the principles of the present invention have been incorporated, it is to be understood that our invention is not to be limited to the particular means shown and described above, but that, in fact, widely different means may be employed in the practice of the broader aspects of our invention.

What we claim, therefore, and desire to secure by Letters Patent is:

1. An implement adapted to be mounted on a tractor for forward movement and for raising and lowering, said implement comprising a main frame, a wheel frame pivoted thereto for movement relative to the main frame about a transverse axis disposed adjacent the forward portion of the wheel frame, a marker arm pivotally mounted adjacent its inner end on the main frame for movement relative thereto about a generally fore-and-aft extending axis disposed adjacent said transverse axis and including a laterally outwardly disposed ground engaging portion, a part carried by said wheel frame disposed adjacent the marker arm and movable in a generally vertical direction when the wheel frame pivots downwardly about said transverse axis, and means connecting said part with said marker arm at a point on the latter adjacent but spaced from said fore-and-aft extending axis, whereby when the implement is raised downward movement of said wheel frame about said transverse axis acts to raise said marker arm.

2. An implement as defined in claim 1, further characterized by said part being adjustable, controllable latch means on the main frame for releasably holding the marker arm in a raised position, and means fixing said part in different positions to the wheel frame.

3. In an agricultural implement adapted to be raised and lowered, the combination of a main frame, a wheel frame pivoted thereto for movement about a first axis that is spaced from the center of gravity of the wheel frame, whereby when the main frame is raised, the wheel frame tends to swing about said first axis, a marker arm pivotally mounted on the main frame for movement relative thereto about a second axis disposed adjacent said first axis and including a ground engaging portion disposed outwardly of said second axis, a part carried by said wheel frame at a point spaced from said first axis, and means connecting said part with said marker arm at a point thereon spaced from said second axis, whereby when the implement is raised said wheel frame acts to raise said marker arm.

4. The combination set forth in claim 3, further characterized by a roller on the outer end of said part, and roller-receiving means on the adjacent portion of said marker arm.

5. The combination set forth in claim 3, further characterized by said marker arm comprising front and rear marker arm sections, pivoted, respectively, to said main frame, means on one marker arm section to receive said wheel frame part, and latch means carried by said main frame and engageable with the other arm section for holding the marker arm in one position.

6. In an agricultural implement adapted to be raised and lowered, the combination of a transverse main frame, a press wheel frame, means pivoting the press wheel frame adjacent its forward portion to the main frame for movement relative thereto about a transverse axis, a marker arm pivoted to each end of the main frame immediately forward of said transverse axis, said wheel frame including portions extending forwardly from said transverse axis and disposed, respectively, underneath the associated marker arms, whereby downward movement of the rear portion of said press wheel frame about said axis acts to raise said marker arms, and marker arm latch means movably carried by said main frame in a position to hold said marker arms in an elevated position.

7. In an agricultural implement adapted to be raised and lowered, the combination of a transverse main frame including a transverse bar having a generally vertical bracket section at each end, a press wheel frame, means pivoting the press wheel frame at its forward portion to the lower portions of said bracket sections for movement about a transverse axis disposed at the forward portion of said press wheel frame and extending through said bracket sections, the center of gravity of the press wheel frame lying rearwardly of said axis, portions of said press wheel frame extending forwardly of said axis and said bracket sections, a marker arm pivoted to each end of said transverse bar and adapted, when lowered, to extend laterally outwardly over the forwardly extended portions of said press wheel frame, whereby downward movement of the rear portion of said press wheel frame about said axis acts through said forwardly extending portion of the press wheel frame to raise said marker arms, and marker arm latch means movably carried by the upper portion of each of said bracket sections.

References Cited in the file of this patent

UNITED STATES PATENTS

| | | |
|---|---|---|
| 650,922 | Wilbur | June 5, 1900 |
| 664,072 | Allen | Dec. 18, 1900 |
| 1,202,227 | Sandifur | Oct. 24, 1916 |
| 1,202,669 | Cambron | Oct. 24, 1916 |
| 1,469,752 | Chase et al. | Oct. 2, 1923 |
| 1,760,128 | Enz | May 27, 1930 |
| 1,824,976 | Altgelt | Sept. 29, 1931 |
| 1,865,800 | Strandlund | July 5, 1932 |
| 1,911,218 | White | May 30, 1933 |
| 1,941,013 | Lindgren et al. | Dec. 26, 1933 |
| 1,988,157 | Bowen | Jan. 15, 1935 |
| 2,015,584 | Benjamin | Sept. 24, 1935 |
| 2,024,778 | Ray | Dec. 17, 1935 |
| 2,063,852 | Ray | Dec. 8, 1936 |
| 2,249,807 | Brown | July 22, 1941 |
| 2,253,706 | Hipple | Aug. 26, 1941 |
| 2,311,993 | Olsen | Feb. 23, 1943 |
| 2,341,146 | Kriegbaum et al. | Feb. 8, 1944 |
| 2,604,027 | Hansen | July 22, 1952 |

FOREIGN PATENTS

| | | |
|---|---|---|
| 624,707 | Great Britain | June 15, 1949 |